(12) United States Patent
Kilcher

(10) Patent No.: US 11,224,313 B2
(45) Date of Patent: Jan. 18, 2022

(54) CUTTING BOARD WITH INTERNAL STORAGE FOR IMPLEMENTS

(71) Applicant: Eivin Kilcher, Homer, AK (US)

(72) Inventor: Eivin Kilcher, Homer, AK (US)

( * ) Notice: Subject to any disclaimer, the term of this patent is extended or adjusted under 35 U.S.C. 154(b) by 131 days.

(21) Appl. No.: 16/711,185

(22) Filed: Dec. 11, 2019

(65) Prior Publication Data

US 2020/0187720 A1 Jun. 18, 2020

Related U.S. Application Data

(60) Provisional application No. 62/778,758, filed on Dec. 12, 2018.

(51) Int. Cl.
*A47J 47/00* (2006.01)
*A47J 47/16* (2006.01)

(52) U.S. Cl.
CPC ............. *A47J 47/005* (2013.01); *A47J 47/16* (2013.01)

(58) Field of Classification Search
CPC ......... A47J 47/005; A47J 47/16; B25B 11/00; B25B 11/02
See application file for complete search history.

(56) References Cited

U.S. PATENT DOCUMENTS

| | | | | |
|---|---|---|---|---|
| 3,926,419 A | * | 12/1975 | Kenny | A47J 47/005 269/16 |
| 5,579,914 A | * | 12/1996 | Thore | A45F 3/46 206/542 |
| 6,131,740 A | * | 10/2000 | Huang | B25H 3/003 206/372 |
| 6,581,774 B1 | * | 6/2003 | Galafassi | A47G 21/14 206/379 |
| 2013/0284619 A1 | * | 10/2013 | Daley | B65D 81/3813 206/216 |
| 2020/0187720 A1 | * | 6/2020 | Kilcher | A47J 47/005 |

* cited by examiner

*Primary Examiner* — Lee D Wilson
(74) *Attorney, Agent, or Firm* — Miller Nash LLP

(57) ABSTRACT

A cutting board having a bottom portion and a top portion. The bottom portion includes a substantially flat first utility surface on an outer side of the bottom portion and one or more primary indentations on an inner side of the bottom portion. Each primary indentation is configured to partially encase an implement, such as a chefs knife. The top portion includes a substantially flat second utility surface on an outer side of the top portion and one or more supplemental indentations on an inner side of the top portion. Each supplemental indentation corresponds to a primary indentation and is configured to further partially encase the implement.

19 Claims, 5 Drawing Sheets

… (US 11,224,313 B2)

CUTTING BOARD WITH INTERNAL STORAGE FOR IMPLEMENTS

CROSS-REFERENCES TO RELATED APPLICATIONS

This patent application claims the benefit of provisional Application No. 62/778,758 filed Dec. 12, 2018. That application is incorporated into the present disclosure by this reference.

TECHNICAL FIELD

The subject matter is related to an gear for camping, fishing, or other such outdoor activities.

BACKGROUND

For outdoor activities such as camping or fishing, space, weight, and convenience may be important, especially when the user carries a substantial amount of gear for the activity. Conventionally, each piece of gear must be carried separately, causing increased weight, bulk, and complexity. Embodiments of the disclosed technology address shortcomings in the conventional methods.

DETAILED DESCRIPTION

As described herein, embodiments are directed to a cutting board on the surface of which materials may be cut by, for example, a knife or another sharp tool. Embodiments may provide internal storage for implements that might otherwise need to be stored or carried elsewhere. Versions of the cutting board may be particularly useful for camping, fishing, or other such outdoor activities where space and convenience may be important. For example, with internal storage, the cutting board and implements may have less weight and take up less space than a conventional cutting board with separate implements. Also, storing implements within the internal storage means that the user will not need to find the desired implement elsewhere in the user's gear. Instead, the implement will be with the cutting board. Additionally, embodiments may be easy to clean, providing few or no inaccessible crevices where contaminants may become trapped.

Figure 1:
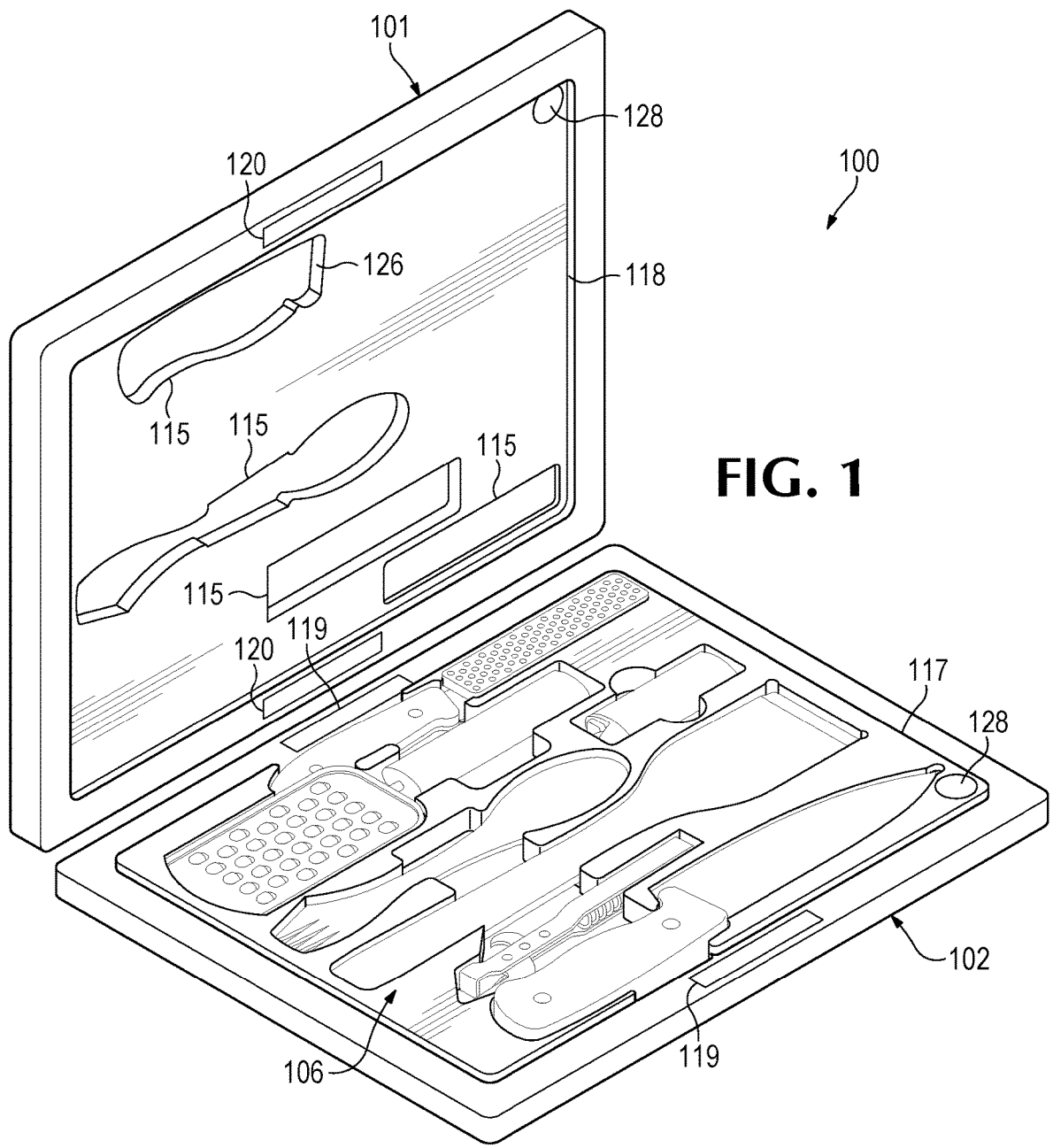
FIG. 1 is a top, perspective view of a cutting board with internal storage for implements, according to embodiments, showing the cutting board in an open configuration to illustrate internal details.
Figure 2:
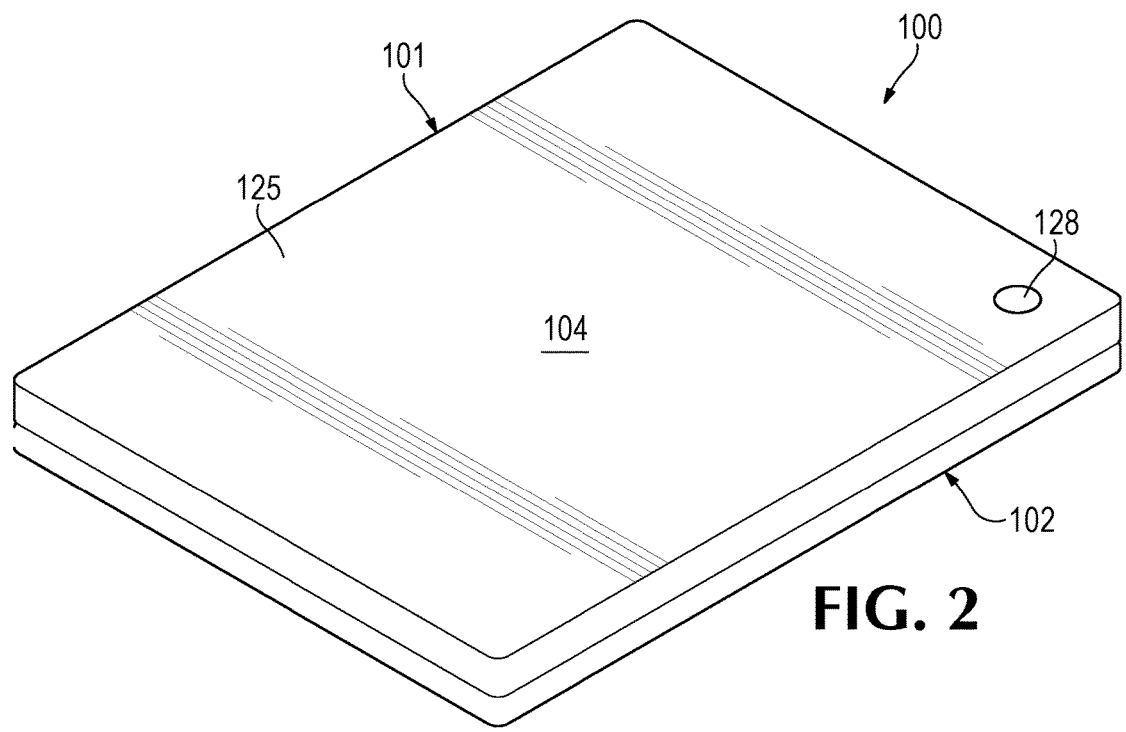
FIG. 2 is a top, perspective view of the cutting board of FIG. 1, showing the cutting board in a closed configuration.
Figure 3:
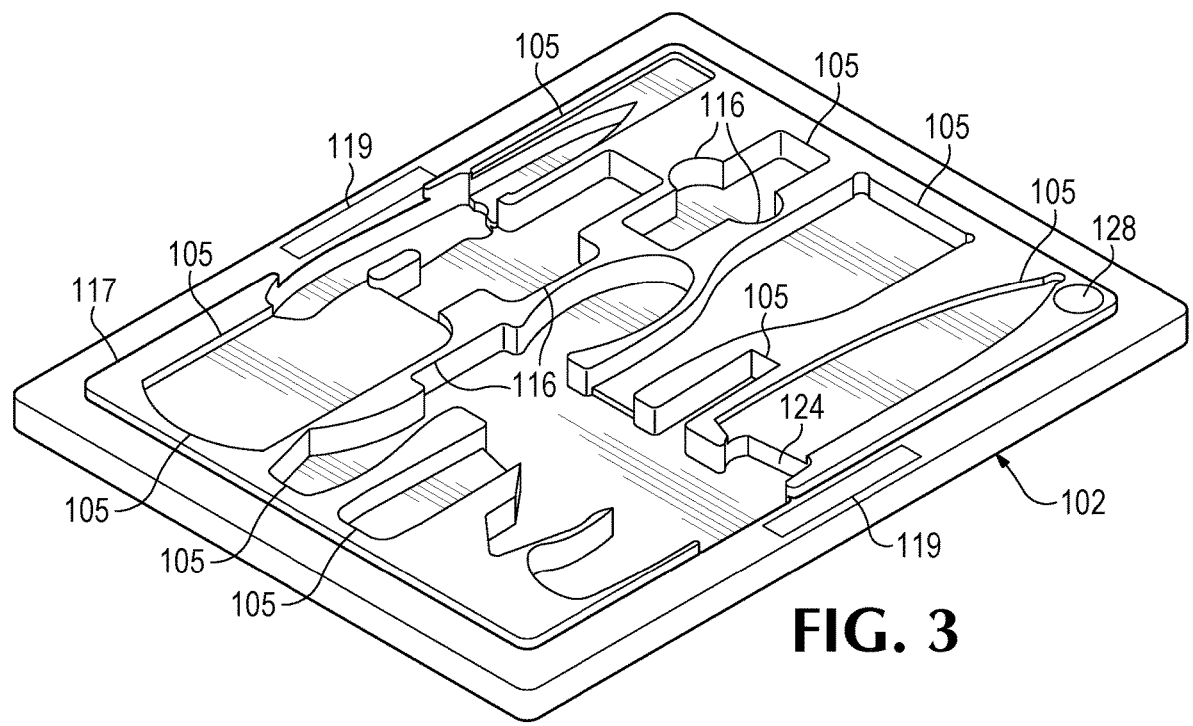
FIG. 3 is a top, perspective view of a bottom portion of the cutting board of FIG. 1 in isolation.
Figure 4:
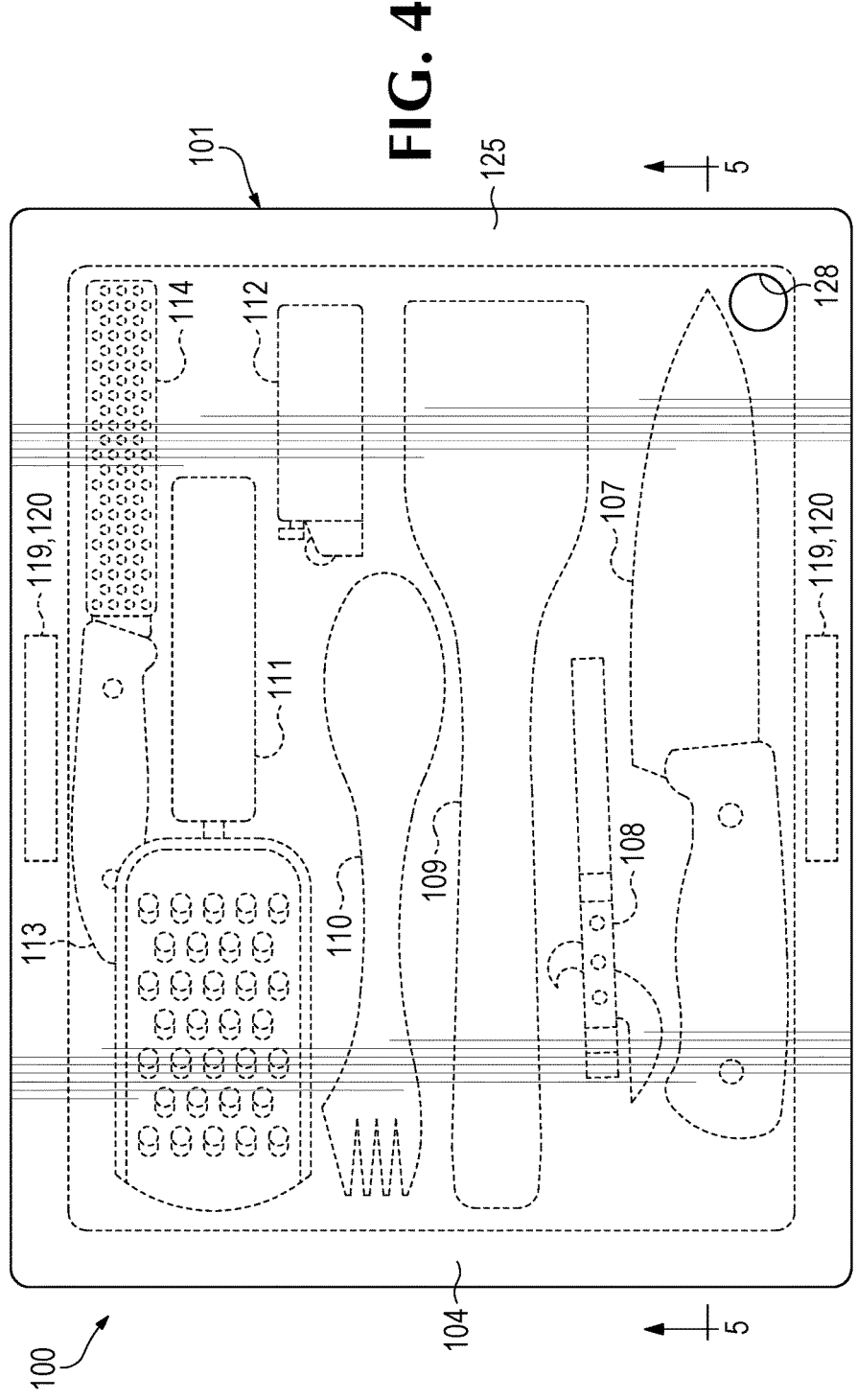
FIG. 4 is a top view of the cutting board of FIG. 2.
Figure 5:
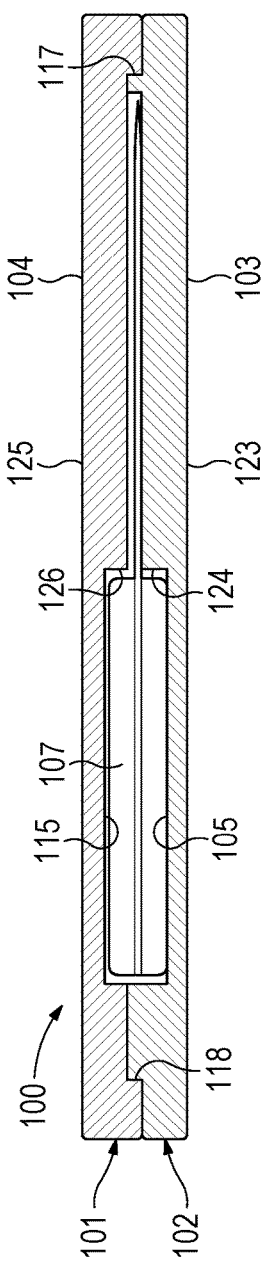
FIG. 5 is a section view along the line indicated in FIG. 4.

FIG. 1 is a top, perspective view showing portions of a cutting board 100 with internal storage for implements, according to embodiments. The cutting board 100 is shown in an open configuration in FIG. 1, in which a top portion 101 is separated from a bottom portion 102 of the cutting board 100. FIG. 2 is a top, perspective view of the cutting board 100 of FIG. 1, showing the cutting board 100 in a closed configuration in which the top portion 101 is joined to the bottom portion 102. FIG. 3 is a top, perspective view of the bottom portion 102 of the cutting board too of FIG. 1 in isolation. FIG. 4 is a top view of the cutting board too of FIG. 2. FIG. 5 is a section view along the line indicated in FIG. 4.

It is understood that directions such as "top" and "bottom" are used for convenience and in reference to the views provided in figures. The cutting board 100, however, may have a number of orientations in actual use. Thus, a feature that is on the top or on the bottom in the figures may not have that same orientation or direction in actual use.

As illustrated in FIGS. 1-5, the cutting board 100 may include a top portion 101 and a bottom portion 102. The bottom portion 102 may include a first utility surface 103 on an outer side 123 of the bottom portion 102. The first utility surface 103 may be substantially flat and be configured as a surface upon which articles may be cut. As used in this disclosure, "substantially flat" means largely or essentially flat without requiring perfect flatness. Such articles may include, for example, meats (including fish and poultry), vegetables, and handicraft materials (such as leather or plastic). Likewise, the top portion 101 may include a second utility surface 104 on an outer side 125 of the top portion 101. As with the first utility surface 103, the second utility surface 104 may be substantially flat and be configured as a surface upon which articles may be cut.

One or both of the top portion 101 and the bottom portion 102 may include one or more primary indentations 105 on an inner side 124 of the bottom portion 102. Each primary indentation 105 may be configured to hold or partially encase one or more implements 106. Hence, the implement 106 may be removable from the primary indentation 105. In this context, "removable" means that the components can be separated and moved away from each other without causing permanent damage to either component. The implement 106 may be, for example, an instrument, a tool, a utensil, or similar device. Examples of implements 106 include, but are not limited to, a chefs knife 107; a bottle opener; a can opener; a corkscrew; a combination bottle opener, can opener, and corkscrew 108; a spatula 109; an eating utensil 110 such as a spoon or fork (or fork-spoon combination, such as shown in FIG. 1); a grater 111, such as a cheese grater or zester; a lighter 112; a paring knife 113; a sharpening block 114; chopsticks; and scissors.

One or both of the top portion 101 and the bottom portion 102 may include one or more supplemental indentations 115 on an inner side 126 of the top portion 101. Each supplemental indentation 115 may correspond to a primary indentation 105 and may be configured to further hold or partially encase the implement 106 that the primary indentation 105 is configured to hold or partially encase. As an example, FIG. 1 illustrates a chefs knife 107 in a primary indentation 105 of the bottom portion 102. Because, for example, the handle of the chefs knife 107 may be thick, the top portion 101 includes a supplemental indentation 115 to hold or partially encase the handle of the chef's knife 107. This is also illustrated in the section view of FIG. 5. Hence, the implement 106 may be removable from the supplemental indentation 115. Yet, as illustrated in FIG. 5, the combination of the primary indentation 105 and the supplemental indentation 115 snugly and securely encases the implement 106 between the top portion 101 and the bottom portion 102. This may be important, for example, to prevent the implements 106 from sliding around within the cutting board 100 when the user is carrying the cutting board 100 from place to place.

The primary indentations 105 and the supplemental indentations 115 may be contoured to substantially follow the outline of the implement 106 that each is configured to hold or partially encase. As used in this disclosure, "substantially follow" means largely or essentially follow without requiring perfect matching in the contour. For example, as illustrated in FIG. 1, the primary indentation 105 and the supplemental indentation 115 for the chefs knife 107 are each contoured to the outline of the chef's knife 107 or portions of the chefs knife 107.

Each primary indentation 105 may include one or more apertures 116 configured to allow a user's fingers to grasp the implement 106 and remove it from the primary indentation 105.

As illustrated in FIGS. 1 and 5 in particular, the bottom portion 102 may include a raised part 117 configured to mate or interlock with a recessed part 118 of the top portion 101 of the cutting board 100. In combination, the raised part 117 and the recessed part 118 may allow the top portion 101 of the cutting board 100 to align with the bottom portion 102 of the cutting board 100 to facilitate joining of the top portion 101 to the bottom portion 102. In embodiments, the bottom portion 102 may include the recessed part 118, while the top portion 101 includes the raised part 117. As noted above, FIG. 2 shows an example of the top portion 101 aligned with and joined to the bottom portion 102.

The cutting board 100 may include one or more fasteners 119, 120 configured to hold together the top portion 101 and the bottom portion 102 of the cutting board 100. The fastener may be, for example, a magnetic fastener. In embodiments having a magnetic fastener, a first part 119 of the magnetic fastener may be embedded in the bottom portion 102 of the cutting board 100, and a second part 120 of the magnetic fastener may be embedded in the top portion 101 of the cutting board 100. Other fastening mechanisms may also be used, including, for example, a hook-and-loop fastener.

The cutting board 100 may be generally rectangular in shape, an example of which is illustrated in FIGS. 1-5. The cutting board 100 may be constructed from, for example, wood, bamboo, plastic, or composite materials, such as a bamboo-plastic composite. The plastic may be, for example, ultra-high-molecular-weight (UHMW) polyethylene, polyvinyl chloride (PVC), melamine resin, or a composite made from acrylic polymer and alumina trihydrate (such as, for example, the composite sold under the CORIAN® brand).

To facilitate cleaning, in embodiments there may be no surfaces of the primary indentations 105 that are not visible from a top view (using the top/bottom conventions of FIGS. 1-7) of the inner side 124 of the bottom portion 102. Likewise, in embodiments there may be no surfaces of the supplemental indentations 115 that are not visible from a bottom view (using the top/bottom conventions of FIGS. 1-7) of the inner side 126 of the top portion 101. Accordingly, in such embodiments there are substantially no inaccessible crevices where contaminants may become trapped.

In embodiments, the cutting board 100 may include external implements affixed to the outside of the cutting board 100, such as an outside edge. Such external implements may include, for example, a bottle opener or knife sharpener. Other external implements could also be used.

In embodiments, instead of or in addition to the primary indentations 105 and the supplemental indentations 115 discussed above, the cutting board 100 may include slots or apertures in the outer edges of the cutting board 100. Such slots or apertures may be configured to receive and store all or a substantial portion of an implement, such as the implements noted above.

Figure 6:
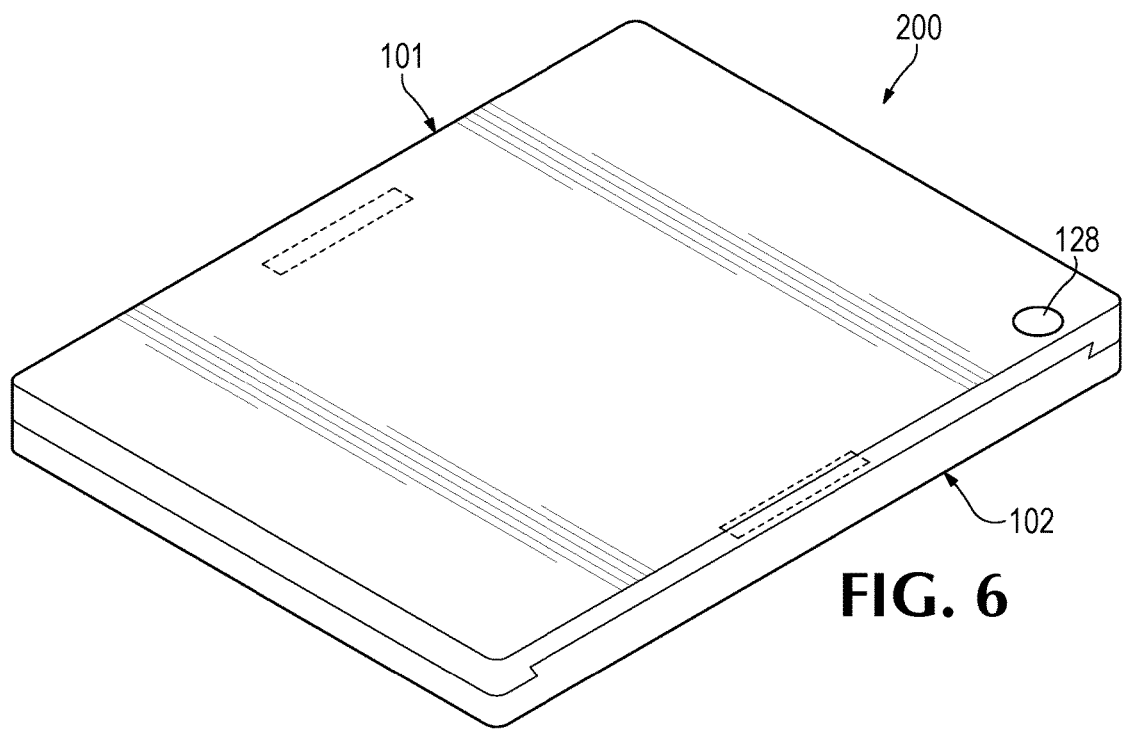
FIG. 6 is a top, perspective view showing a variation of the cutting board of FIG. 1, in which the top portion joins the bottom portion of the cutting board through a dovetail joint.
Figure 7:
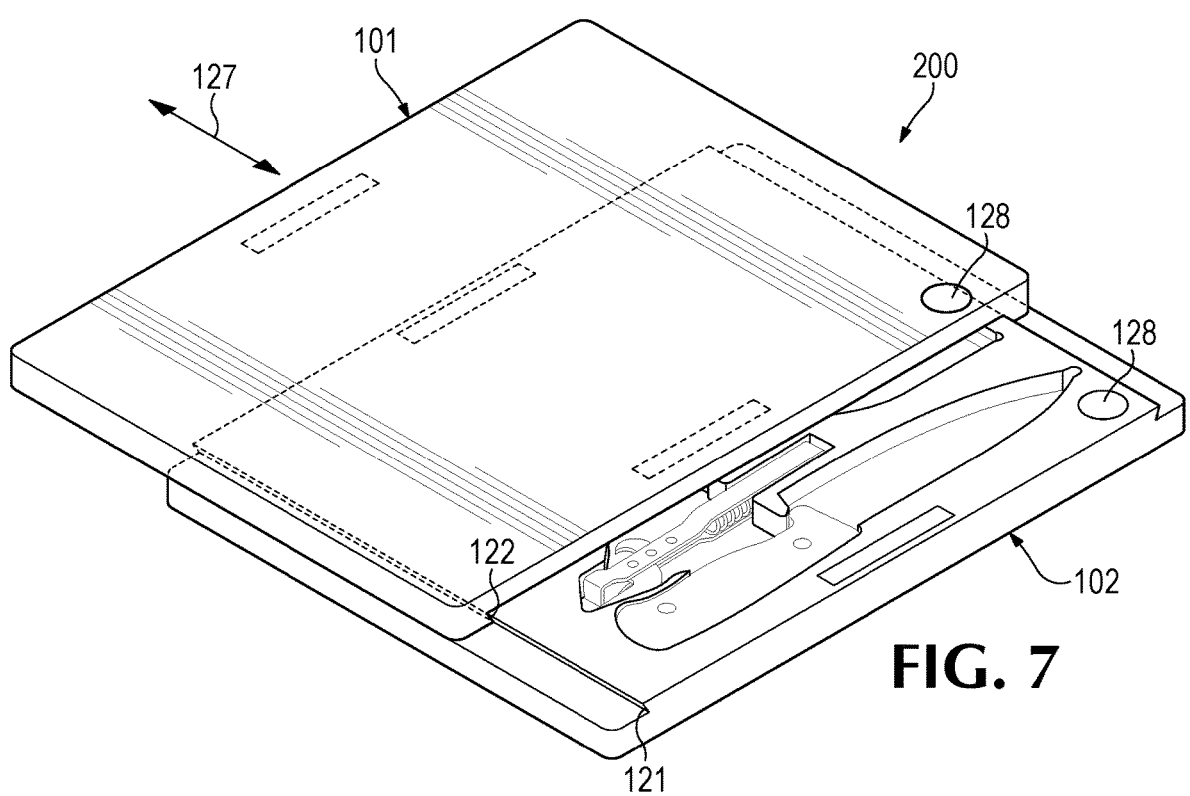
FIG. 7 is a top, perspective view of the cutting board of FIG. 6, showing the cutting board in a partially open configuration.

FIG. 6 is a top, perspective view showing a cutting board 200 that is a variation of the cutting board 100 of FIGS. 1-5, in which the top portion 101 joins the bottom portion 102 through a dovetail joint. FIG. 7 is a top, perspective view of the cutting board 200 of FIG. 6, showing the cutting board 200 in a partially open configuration. The cutting board 200 of FIGS. 6 and 7 may be identical to the cutting board 100 of FIGS. 1-5, including all of the options and alternatives discussed above for FIGS. 1-5, except as noted here. Accordingly, the reference numbers indicated in FIGS. 6 and 7 correspond to those used above to describe FIGS. 1-5.

As illustrated in FIGS. 6 and 7, each of the raised part 117 and the recessed part 118 may include an inclined surface. The inclined surface 121 of the raised part 117 may be configured to contact the inclined surface 122 of the recessed part 118. This dovetail configuration may prevent the top portion 101 from being removed from the bottom portion 102, except by sliding the top portion 101 relative to the bottom portion 102. An example of the sliding engagement and disengagement is shown in FIG. 7. Stated another way, this dovetail configuration allows the bottom portion to slide relative to the top portion in a first direction 127 and to substantially prevent translation of the bottom portion 102 relative to the top portion 101 in directions that are not substantially parallel to the first direction 127. As used in this disclosure, "substantially parallel" means largely or essentially equidistant at all points, without requiring perfect parallelism.

As illustrated in FIGS. 6 and 7, the cutting board 100 may include a hole through the top portion 101, including through the second utility surface 104, and a hole through the bottom portion 102, including through the first utility surface 103. In the closed configuration, the hole through the top portion 101 may be aligned with the hole through the bottom portion 102 to create a hole 127 through the cutting board 100. The hole may be used, for example, as a finger hold for the cutting board 100. Hence, the hole may be configured to accept a user's finger. As another example, the hole may be used to lock the top portion 101 to the bottom portion 102 in the closed configuration by, for example, passing a securing a rope, lanyard, leather string, cable tie, carabiner, or similar device through the hole. Although illustrated in FIGS. 6 and 7, these holes may also be present in the embodiments illustrated in FIGS. 1-5.

Figure 8A:
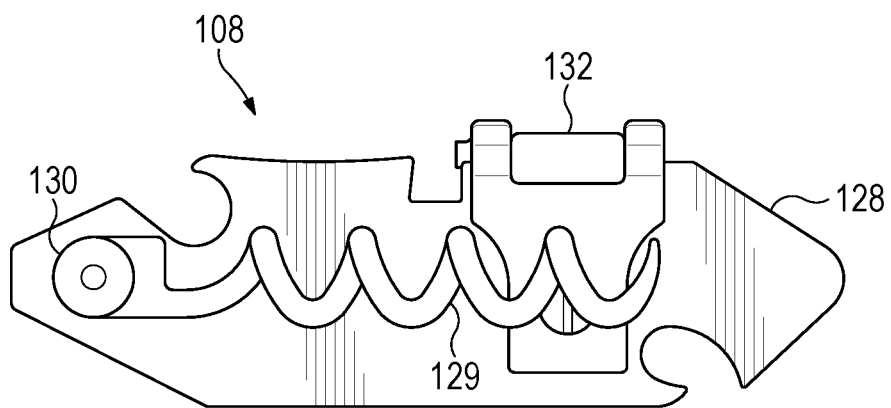
FIG. 8A is a front view of a combination bottle opener, can opener, and corkscrew according to embodiments.
Figure 8B:
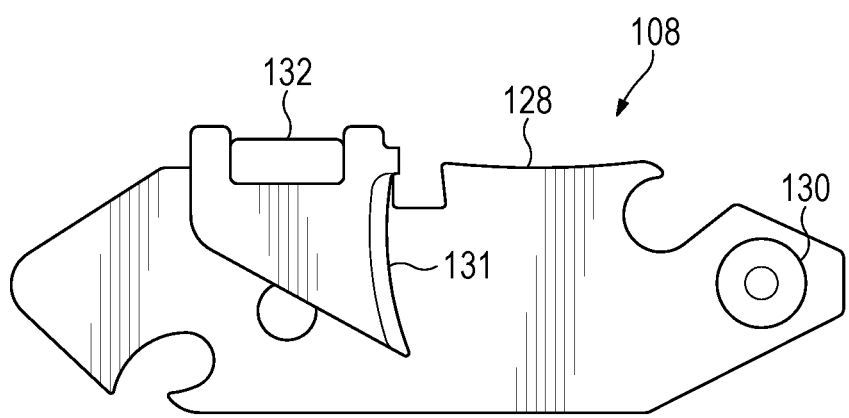
FIG. 8B is a rear view of the combination bottle opener, can opener, and corkscrew of FIG. 8A.

The combination bottle opener, can opener, and corkscrew 108 may be in the configuration shown in FIG. 1, or the combination bottle opener, can opener, and corkscrew 108 may have a different configuration. For example, the combination bottle opener, can opener, and corkscrew 108 illustrated in FIGS. 8A and 8B may include a bottle opener portion 128 that is substantially flat with a corkscrew 129 attached to the substantially flat bottle opener portion 128 by, for example, a rivet 130, or another fastener. The combination bottle opener, can opener, and corkscrew 108 may further include a can opener portion 131 that is connected by a hinge 132 to the substantially flat bottle opener portion 128, allowing the can opener portion 131 to fold against the substantially flat bottle opener portion 128 when not in use.

EXAMPLES

Illustrative examples of the disclosed technologies are provided below. An embodiment of the technologies may include one or more, and any combination of, the examples described below.

Example 1 includes a cutting board comprising: a bottom portion comprising: a substantially flat first utility surface on an outer side of the bottom portion, and one or more primary indentations on an inner side of the bottom portion, the inner side of the bottom portion being opposite the outer side of the bottom portion, each primary indentation being configured to partially encase an implement; and a top portion comprising: a substantially flat second utility surface on an outer side of the top portion, and one or more supplemental indentations on an inner side of the top portion, the inner side of the top portion being opposite the outer side of the top portion, each supplemental indentation corresponding to a primary indentation and being configured to further partially encase the implement.

Example 2 includes the cutting board of Example 1, in which a primary indentation of the one or more primary indentations is contoured to substantially follow an outline of a corresponding implement.

Example 3 includes the cutting board of Example 2, in which a supplemental indentation of the one or more supplemental indentations corresponds to the primary indentation and is contoured to substantially follow an outline of the corresponding implement.

Example 4 includes the cutting board of any of Examples 1-3, further comprising a fastener configured to hold together the top portion and the bottom portion in a closed configuration of the cutting board.

Example 5 includes the cutting board of Example 4, in which the fastener comprises a magnetic fastener.

Example 6 includes the cutting board of Example 5, in which a first part of the magnetic fastener is embedded in the bottom portion, and a second part of the magnetic fastener is embedded in the top portion.

Example 7 includes the cutting board of Example 4, in which the fastener comprises a hook-and-loop fastener.

Example 8 includes the cutting board of any of Examples 1-7, in which one of the top portion or the bottom portion further comprises a raised part, and in which another one of the top portion or the bottom portion further comprises a recessed part configured to mate with the raised part in a closed configuration of the cutting board.

Example 9 includes the cutting board of Example 8, in which the raised part comprises a first inclined surface, in which the recessed part comprises a second inclined surface, and in which the first inclined surface of the raised part is configured to contact and interlock with the second inclined surface of the recessed part in a closed configuration of the cutting board.

Example 10 includes the cutting board of Example 9, in which the first inclined surface and the second inclined surface in the closed configuration are configured to allow the bottom portion to slide relative to the top portion in a first direction and to substantially prevent translation of the bottom portion relative to the top portion in each direction not substantially parallel to the first direction.

Example 11 includes the cutting board of any of Examples 1-10, further comprising an implement removably and partially encased in a primary indentation of the one or more primary indentations.

Example 12 includes the cutting board of Example 11, in which the primary indentation includes one or more apertures configured to allow a user's fingers to grasp the implement and remove it from the primary indentation.

Example 13 includes the cutting board of any of Examples 11-12, wherein the implement is a chef's knife, a bottle opener, a can opener, a corkscrew, a spatula, an eating utensil, a grater, a lighter, a paring knife, a sharpening block, chopsticks, or scissors.

Example 14 includes the cutting board of any of Examples 1-13, further comprising a hole extending through both the bottom portion and the top portion.

The previously described versions of the disclosed subject matter have many advantages that were either described or would be apparent to a person of ordinary skill. Even so, all of these advantages or features are not required in all versions of the disclosed apparatus, systems, or methods.

Additionally, this written description makes reference to particular features. It is to be understood that the disclosure in this specification includes all possible combinations of those particular features. For example, where a particular feature is disclosed in the context of a particular aspect or embodiment, that feature can also be used, to the extent possible, in the context of other aspects and embodiments.

Also, when reference is made in this application to a method having two or more defined steps or operations, the defined steps or operations can be carried out in any order or simultaneously, unless the context excludes those possibilities.

Furthermore, the term "comprises" and its grammatical equivalents are used in this application to mean that other components, features, steps, processes, operations, etc. are optionally present. For example, an article "comprising" or "which comprises" components A, B, and C can contain only components A, B, and C, or it can contain components A, B, and C along with one or more other components.

Although specific embodiments have been illustrated and described for purposes of illustration, it will be understood that various modifications may be made without departing from the spirit and scope of the disclosure. Accordingly, the invention should not be limited except as by the appended claims.

I claim:

1. A cutting board comprising:
    a bottom portion comprising:
        a substantially flat first utility surface on an outer side of the bottom portion, and
        one or more primary indentations on an inner side of the bottom portion, the inner side of the bottom portion being opposite the outer side of the bottom portion, each primary indentation being configured to partially encase an implement; and
    a top portion comprising:
        a substantially flat second utility surface on an outer side of the top portion, and one or more supplemental indentations on an inner side of the top portion, the inner side of the top portion being opposite the outer side of the top portion, each supplemental indentation corresponding to a primary indentation and being configured to further partially encase the implement;
    in which one of the top portion or the bottom portion further comprises a raised part, and in which another one of the top portion or the bottom portion further comprises a recessed part configured to mate with the raised part in a closed configuration of the cutting board, and in which the raised part comprises a first inclined surface, in which the recessed part comprises a second inclined surface, and in which the first inclined surface of the raised part is configured to contact and interlock with the second inclined surface of the recessed part in a closed configuration of the cutting board.

2. The cutting board of claim 1, in which a primary indentation of the one or more primary indentations is contoured to substantially follow an outline of a corresponding implement.

3. The cutting board of claim 2, in which a supplemental indentation of the one or more supplemental indentations corresponds to the primary indentation and is contoured to substantially follow an outline of the corresponding implement.

4. The cutting board of claim 1, further comprising a fastener configured to hold together the top portion and the bottom portion in a closed configuration of the cutting board.

5. The cutting board of claim 4, in which the fastener comprises a magnetic fastener.

6. The cutting board of claim 5, in which a first part of the magnetic fastener is embedded in the bottom portion, and a second part of the magnetic fastener is embedded in the top portion.

7. The cutting board of claim 1, in which the first inclined surface and the second inclined surface in the closed configuration are configured to allow the bottom portion to slide relative to the top portion in a first direction and to substantially prevent translation of the bottom portion relative to the top portion in each direction not substantially parallel to the first direction.

8. The cutting board of claim 1, further comprising an implement removably and partially encased in a primary indentation of the one or more primary indentations.

9. The cutting board of claim 8, in which the primary indentation includes one or more apertures configured to allow a user's fingers to grasp the implement and remove it from the primary indentation.

10. The cutting board of claim 8, wherein the implement is a chef's knife, a bottle opener, a can opener, a corkscrew, a spatula, an eating utensil, a grater, a lighter, a paring knife, a sharpening block, chopsticks, or scissors.

11. The cutting board of claim 1, further comprising a hole extending through both the bottom portion and the top portion.

12. A cutting board comprising:
  a bottom portion comprising:
    a substantially flat first utility surface on an outer side of the bottom portion, and
    one or more primary indentations on an inner side of the bottom portion, the inner side of the bottom portion being opposite the outer side of the bottom portion, each primary indentation being configured to partially encase an implement;
  a top portion comprising:
    a substantially flat second utility surface on an outer side of the top portion, and one or more supplemental indentations on an inner side of the top portion, the inner side of the top portion being opposite the outer side of the top portion, each supplemental indentation corresponding to a primary indentation and being configured to further partially encase the implement; and
  a fastener configured to hold together the top portion and the bottom portion in a closed configuration of the cutting board, the fastener comprising a magnetic fastener.

13. The cutting board of claim 1, in which a primary indentation of the one or more primary indentations is contoured to substantially follow an outline of a corresponding implement.

14. The cutting board of claim 2, in which a supplemental indentation of the one or more supplemental indentations corresponds to the primary indentation and is contoured to substantially follow an outline of the corresponding implement.

15. The cutting board of claim 12, in which a first part of the magnetic fastener is embedded in the bottom portion, and a second part of the magnetic fastener is embedded in the top portion.

16. The cutting board of claim 1, further comprising an implement removably and partially encased in a primary indentation of the one or more primary indentations.

17. The cutting board of claim 8, in which the primary indentation includes one or more apertures configured to allow a user's fingers to grasp the implement and remove it from the primary indentation.

18. The cutting board of claim 8, wherein the implement is a chef's knife, a bottle opener, a can opener, a corkscrew, a spatula, an eating utensil, a grater, a lighter, a paring knife, a sharpening block, chopsticks, or scissors.

19. The cutting board of claim 1, further comprising a hole extending through both the bottom portion and the top portion.

* * * * *